United States Patent
Kim et al.

(10) Patent No.: US 9,906,336 B2
(45) Date of Patent: Feb. 27, 2018

(54) METHOD AND APPARATUS FOR TRANSMITTING CHANNEL INFORMATION IN COGNITIVE RADIO NETWORK AND METHOD AND APPARATUS FOR PERFORMING CHANNEL SWITCHING

(71) Applicants: LG Electronics Inc., Seoul (KR); SNU R&DB Foundation, Seoul (KR)

(72) Inventors: Eunsun Kim, Gyeonggi-do (KR); Yongho Seok, Gyeonggi-do (KR); Whasook Jeon, Seoul (KR); Dongheon Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/072,860

(22) Filed: Mar. 17, 2016

(65) Prior Publication Data

US 2016/0269155 A1     Sep. 15, 2016

Related U.S. Application Data

(62) Division of application No. 13/994,181, filed as application No. PCT/KR2011/009686 on Dec. 15, 2011.

(Continued)

(51) Int. Cl.
*H04W 72/04* (2009.01)
*H04L 5/00* (2006.01)
(Continued)

(52) U.S. Cl.
CPC .......... *H04L 5/0007* (2013.01); *H04L 5/0039* (2013.01); *H04L 27/0006* (2013.01); *H04W 16/14* (2013.01); *H04W 84/12* (2013.01)

(58) Field of Classification Search
CPC ..... H04W 16/14; H04W 28/18; H04W 84/12; H04W 72/0406; H04W 72/082;
(Continued)

(56) References Cited

U.S. PATENT DOCUMENTS

2008/0144749 A1   6/2008   Wilhelmsson et al.
2008/0192847 A1   8/2008   Classon et al.
(Continued)

FOREIGN PATENT DOCUMENTS

KR   10-2010-0013505 A   2/2010

OTHER PUBLICATIONS

Office Action dated May 10, 2016, issued by the United States Patent and Trademark Office in U.S. Appl. No. 13/994,181.
(Continued)

*Primary Examiner* — Sai Aung
(74) *Attorney, Agent, or Firm* — Morgan, Lewis & Bockius LLP

(57) ABSTRACT

A method and apparatus for transmitting channel information used by a station form among TV white space channels, and a method and apparatus for performing channel switching are disclosed. A method for transmitting information of a channel used by a station from among TV white space channels includes determining one or more channels used by the station from among channels contained in a plurality of OFDM blocks, wherein each OFDM block includes one or more contiguous channels from among the TV white space channels, generating a message including first information indicating the lowest channel number from among channels contained in a first OFDM block from among the plurality of OFDM blocks, second information indicating the lowest channel number from among channels contained in a second OFDM block, third information indicating the one or more channels used by the station as bitmap information, and (Continued)

fourth information indicating a total amount of bandwidth used by the station, and transmitting the generated message.

4 Claims, 10 Drawing Sheets

Related U.S. Application Data

(60) Provisional application No. 61/423,601, filed on Dec. 16, 2010.

(51) Int. Cl.
*H04W 16/14* (2009.01)
*H04L 27/00* (2006.01)
*H04W 84/12* (2009.01)

(58) Field of Classification Search
CPC . H04W 72/02; H04W 72/04; H04W 72/0446; H04W 72/0453; H04L 5/0041
See application file for complete search history.

(56) References Cited

U.S. PATENT DOCUMENTS

| 2008/0240275 | A1 | 10/2008 | Cai |
| 2009/0060081 | A1 | 3/2009 | Zhang et al. |
| 2009/0310476 | A1 | 12/2009 | Seo et al. |
| 2009/0323610 | A1 | 12/2009 | Gaddam et al. |
| 2010/0002675 | A1 | 1/2010 | Fu et al. |
| 2010/0075704 | A1* | 3/2010 | McHenry ............... H04W 16/14 455/509 |
| 2011/0026623 | A1 | 2/2011 | Srinivasa et al. |
| 2011/0064042 | A1* | 3/2011 | Kim .................... H04L 5/1469 370/329 |
| 2011/0103509 | A1 | 5/2011 | Chen et al. |
| 2011/0116488 | A1* | 5/2011 | Grandhi ............... H04B 7/0626 370/338 |
| 2011/0128900 | A1 | 6/2011 | Seok |
| 2012/0051257 | A1 | 3/2012 | Kim et al. |
| 2012/0051464 | A1 | 3/2012 | Kamuf et al. |
| 2012/0114021 | A1 | 5/2012 | Chung et al. |
| 2013/0156005 | A1* | 6/2013 | Li ........................... H04L 5/001 370/331 |
| 2013/0170470 | A1* | 7/2013 | Kneckt ............. H04W 72/0446 370/330 |

OTHER PUBLICATIONS

Shellhammer et al., "Technical Challenges for Cognitive Radio in the TV White Space Spectrum," Information Theory and Applications Workshop, pp. 323-333, Feb. 8-13, 2009.
Borth et al. "Considerations for Successful Cognitive Radio Systems in US TV White Space," 3rd IEEE Symposium on New Frontiers in Dynamic Spectrum Access Networks, pp. 1-5, Oct. 14-17, 2008.
Stevenson et al. "IEEE 802.22: The First Cognitive Radio Wireless Regional Area Network Standard," IEEE Communications Magazine, vol. 47, No. 1, pp. 130-138, Jan. 2009.
Written Opinion and International Search Report issued in corresponding International Patent Application No. PCT/KR2011/009686 dated Jun. 22, 2012.
Chia et al., "Multi-block OFDM for TVWS Operation," IEEE 802.11-10/0608r1, pp. 1-13, May 2010.
Noh et al., LG Electronics, Inc., "Channel Selection and Management for 11ac," IEEE 802.11-10/0593r0, pp. 1-21, Kyungki-Do, Korea, May 2010.
Notice of Allowance issued in corresponding Korean Patent Application No. 10-2013-7018453 dated Apr. 13, 2017.

\* cited by examiner

| Element ID | Length | Channel Switch Mode | New Regulatory Class | Channel Switch Count | Non-contiguous | Reserved | New First Channel Number | New Second Channel Number | New Operating Channel Bitmap |
|---|---|---|---|---|---|---|---|---|---|
| Octets: 1 | 1 | 1 | 1 | 1 | | 1 | 1 | 1 | 1 |

FIG. 9

| | | | | | B0 | B1 – B7 | B8 – B15 | B16 – B23 | B24 – B31 |
|---|---|---|---|---|---|---|---|---|---|
| Category | Action value | Channel Switch Mode | New Regulatory Class | Channel Switch Count | Non-contiguous | Reserved | New First Channel Number | New Second Channel Number | New Operating Channel Bitmap |
| Octets: 1 | 1 | 1 | 1 | 1 | | 1 | 1 | 1 | 1 |

METHOD AND APPARATUS FOR TRANSMITTING CHANNEL INFORMATION IN COGNITIVE RADIO NETWORK AND METHOD AND APPARATUS FOR PERFORMING CHANNEL SWITCHING

CROSS REFERENCE TO RELATED APPLICATIONS

The present application is a divisional of U.S. patent application Ser. No. 13/994,181, filed on Jun. 14, 2013, the entire disclosure of which is hereby incorporated by reference for all purposes as if fully set forth herein. U.S. patent application Ser. No. 13/994,181 is a U.S. National Stage Entry of PCT International Application No. PCT/KR2011/009686, filed on Dec. 15, 2011, and claims the benefit of U.S. Provisional Application No. 61/423,601, filed on Dec. 16, 2010.

TECHNICAL FIELD

The present invention relates to a wireless communication system, and more particularly to a cognitive radio network using a television white space channel.

BACKGROUND ART

Radio resources are national restricted intangible assets. As the number of users who use wireless devices rapidly increases, the value of radio resources is rapidly increasing. Specifically, the number of radio frequency (RF) services, for example, mobile communication, WLAN, digital broadcasting, satellite communication, radio frequency identification/ubiquitous sensor network (RFID/USN), Ultra Wide Band (UWB) communication, wireless broadband (WiBro), etc. is rapidly increasing, the demand for restricted radio resources is also rapidly increasing.

Cognitive Radio (CR) technology has been proposed by Joseph Mitola. The CR technology searches for and uses a frequency band that is allocated to a specific communication/broadcast service (or an enterpriser) and is not used in a specific region at a specific time, so as to increase frequency use efficiency.

TV broadcast band has been mostly focused as an operation band of a network based on CR technology (hereinafter referred to as a CR network). In recent times, Federal Communications Commission (FCC) has been announced the regulation of using the CR network for the TV broadcast band. Standardization of the CR network using the TV broadcast band is being intensively conducted by the international standardization organization such as the Institute of Electrical and Electronics Engineers (IEEE) 802.11. Specifically, standardization of an IEEE 802.11-based CR network (hereinafter referred to as IEEE 802.11 TVWS network) is being intensively conducted by the IEEE 802.11af task group.

DISCLOSURE OF INVENTION

Technical Problem

Accordingly, the present invention is directed to a method and apparatus for transmitting channel information in a cognitive radio network and a method and apparatus for performing channel switching in a cognitive radio network, that substantially obviate one or more problems due to limitations and disadvantages of the related art.

The CR network includes a primary user (PU) who has primarily assigned the corresponding band, such that it needs to efficiently guarantee a frequency band as well as to operate without affecting PU communication. Channel switching is requisite for PU appearance.

An object of the present invention is to provide a method for transmitting use channel information of a TV white space and a method for performing channel switching.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method for transmitting information of a channel used by a station from among TV white space channels, the method including determining one or more channels used by the station from among channels contained in a plurality of OFDM blocks, wherein each OFDM block includes one or more contiguous channels from among the TV white space channels; generating a message including first information indicating the lowest channel number from among channels contained in a first OFDM block, second information indicating the lowest channel number from among channels contained in a second OFDM block, third information indicating the one or more channels used by the station as bitmap information, and fourth information indicating a total amount of bandwidth used by the station; and transmitting the generated message.

An unused channel from among the contiguous channels contained in each OFDM block may be nullified.

The station may be an access point, and the message may be contained in a beacon frame that is broadcast at the access point.

The message further may include fifth information indicating whether the one or more channels used by the station are contiguous to one another.

If the one or more channels used by the station may be contiguous to one another and the total amount of bandwidth is two times an amount of each OFDM block, the message does not include the third information.

If the total amount of bandwidth may be identical to a half of an amount of each OFDM block, the message does not include the third information.

In another aspect of the present invention, an apparatus for transmitting information of a channel used by a station from among TV white space channels includes a radio frequency (RF) unit; and a processor. The processor determines one or more channels used by the station from among channels contained in a plurality of OFDM blocks, each OFDM block including one or more contiguous channels from among the TV white space channels, and generates a message including first information indicating the lowest channel number from among channels contained in a first OFDM block from among the plurality of OFDM blocks, second information indicating the lowest channel number from among channels contained in a second OFDM block, third information indicating the one or more channels used by the station as bitmap information, and fourth information indicating a total amount of bandwidth used by the station.

In another aspect of the present invention, a method for indicating channel switching by a station that uses TV white space channels includes determining one or more channels used by the station from among channels contained in a plurality of OFDM blocks, wherein each OFDM block includes one or more contiguous channels from among the TV white space channels; determining whether interference occurs in the one or more channels used by the station; determining whether the interference is caused by a primary user; and transmitting a message indicating channel switching when the interference is caused by the primary user, wherein the message includes first information indicating the lowest channel number from among channels contained in a first OFDM block from among the plurality of OFDM blocks, second information indicating the lowest channel number from among channels contained in a second OFDM block, third information indicating one or more channels to be used by the station as bitmap information, and fourth information indicating a total amount of bandwidth to be used by the station, wherein the first to fourth information indicates one or more channels to be used after completion of the channel switching.

If any one of a case in which an access point does not receive an acknowledgement (ACK) after transmitting data, a case in which the station does not receive a Confirm To Send (CTS) message after transmitting a Ready To Send (RTS), and a case in which the station does not receive a beacon frame successively occurs, or if an energy higher than a predetermined value is received during the quiet period (QP), the station determines the interference occurs.

The determining whether the interference is caused by the primary user may be achieved by searching for information of the primary user in a primary user database.

If the interference is caused by a station coupled to a different access point instead of the primary user, the station may request transmission power control (TPC) from the different access point.

The unused channel from among the contiguous channels contained in each OFDM block may be nullified.

The station may be an access point, and the message may be contained in a beacon frame that is broadcast at the access point.

The beacon frame may be transmitted to all currently-used channels before or after the channel switching.

The message further may include fifth information indicating whether the one or more channels to be used before or after the channel switching are contiguous to one another.

In yet another aspect of the present invention, an apparatus for indicating channel switching by a station that uses TV white space channels includes a radio frequency (RF) unit, and a processor. The processor determines one or more channels used by the station from among channels contained in a plurality of OFDM blocks, each OFDM block including one or more contiguous channels from among the TV white space channels, determines whether an interference occurs in the one or more channels used by the station, determines whether the interference is caused by a primary user, and transmits a message indicating channel switching when the interference is caused by the primary user, wherein the message includes first information indicating the lowest channel number from among channels contained in a first OFDM block, second information indicating the lowest channel number from among channels contained in a second OFDM block, third information indicating one or more channels to be used by the station as bitmap information, and fourth information indicating a total amount of bandwidth to be used by the station, wherein the first to fourth information indicates one or more channels to be used after completion of the channel switching.

Advantageous Effects of Invention

Exemplary embodiments of the present invention have the following effects. The embodiments of the present invention can efficiently use a TV white space, and can protect the primary user (PU) and at the same time can stably operate the network.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 4 shows a modified Dynamic STA Enablement (DSE) Registered Location element format according to one embodiment of the present invention;

FIG. 5 shows a modified DSE Registered Location element format according to another embodiment of the present invention;

FIG. 8 shows a message indicating channel switching according to one embodiment of the present invention;

FIG. 9 shows a message indicating channel switching according to another embodiment of the present invention.

BEST MODE FOR CARRYING OUT THE INVENTION

Figure 1:
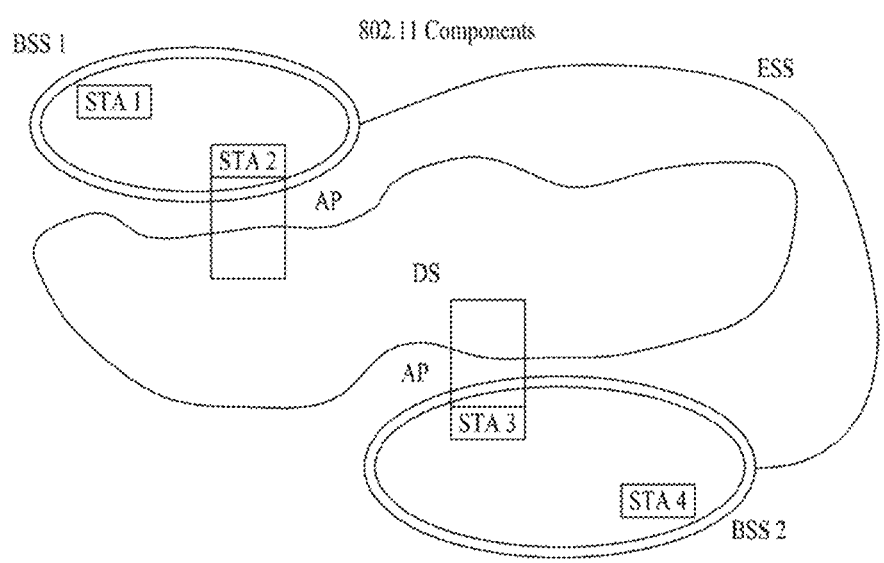
FIG. 1 is a conceptual diagram illustrating a Wireless Local Area Network (WLAN) system.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE?Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 is a conceptual diagram illustrating a Wireless Local Area Network (WLAN) system.

Referring to FIG. 1, the WLAN system includes one or more basic service sets (BSSs). The BSS is a set or aggregate of stations (STAs) capable of successfully performing synchronization and communication, and does not indicate a specific region.

The STA is an arbitrary functional medium including not only a medium access control (MAC) satisfying the IEEE 802.11 standard specification but also a physical layer interface regarding a wireless medium, and may include an AP and a non-AP STA in a broad sense. A mobile terminal manipulated by a user from among STAs is a non-AP STA. If necessary, the term "STA" may also indicate the non-AP STA. The non-AP STA may also be called a terminal, a wireless transmit/receive unit (WTRU), a user equipment (UE), a mobile station (MS), a mobile terminal, a mobile subscriber unit, or the like.

The AP is a functional entity that is capable of providing access to a distribution system (DS) to associated STAs coupled to the AP via a wireless medium. The AP may be referred to as a centralized controller, a Base Station (BS), a Node-B, a Base Transceiver System (BTS), a site controller, etc. In FIG. 1, STA2 or STA3 may correspond to the AP.

The distribution system (DS) is a mechanism for enabling one AP to communicate with another AP. For STAs coupled to the BSS managed by the AP, the AP may transmit a frame through the DS. In addition, if any one STA moves to another BSS, the frame may also be transmitted through the DS. The AP may transmit a frame to an external network such as a wired network through the DS. The DS is not always equal to a network. If the DS can provide a predetermined distribution service prescribed in IEEE 802.11, there is no limitation in distribution service formats. For example, the DS may be a wireless network such as a mesh network or may also be a physical structure for interconnecting APs.

The BSS may be classified into an infrastructure BSS and an Independent BSS (IBSS).

The infrastructure BSS may include one or more non-AP STAs, an AP for providing a DS, and a DS for interconnecting a plurality of APs. The infrastructure BSS enables the AP to manage non-AP STAs of the BSS. Although communication between non-AP STAs in the infrastructure BSS including the AP is performed via an AP in principle, direct communication between the non-AP STAs may be performed when a direct link therebetween is established.

On the other hand, the independent BSS (IBSS) is a BSS operating in an ad-hoc mode. The IBSS does not include the AP such that it has no centralized management entity. That is, the IBSS may manage non-AP STAs in a distributed manner. In the IBSS, all STAs may be mobile STAs. The IBSS forms a self-contained network because no access to a DS is available.

A plurality of infrastructure BSSs may be interconnected by use of a DS. A plurality of BSSs connected through the DS is referred to as an Extended Service Set (ESS). STAs included in the ESS may communicate with one another. In the same ESS, a non-AP STA may move from one BSS to another BSS while performing seamless communication.

Although the embodiments of the present invention have exemplarily disclosed the infrastructure BSS as an example, the scope or spirit of the embodiments are not limited thereto.

An interference avoidance procedure and a channel switching procedure under the condition that a physical layer transmission scheme is used in the IEEE 802.11 TVWS network and interference occurs in the physical layer transmission scheme will hereinafter be described in detail.

In the case of the IEEE 802.11 network, 5 MHz, 10 MHz, or 20 MHz may be used as an available bandwidth. In the TV white space, a bandwidth of one channel is set to 6 MHz in United States and Japan, is set to 7 MHz in Australia, and is set to 8 MHz in Europe. For convenience of description and better understanding of the present invention, the channel bandwidth 6 MHz for United States is exemplarily applied to the embodiments of the present invention.

That is, if the used bandwidth is set to 5 MHz, one channel is needed. If the used bandwidth is set to 10 MHz, two channels are needed. If the used bandwidth is set to 20 MHz, four channels are needed. In other words, a plurality of TV channels must be simultaneously used to support communication of the 10 MHz bandwidth or communication of the 20 MHz bandwidth. In order to simultaneously use multiple TV channels, a multi-block OFDM scheme is used. In this case, the term "OFDM block" means a set or aggregate of contiguous channels of a TV white space corresponding to a bandwidth occupied by multiple subcarriers of an OFDM system. Therefore, the multi-block OFDM means the use of multiple OFDM blocks. In addition, the multiple OFDM blocks have different intermediate frequencies, and are transmitted at the same time. For convenience of description and better understanding of the present invention, respective OFDM blocks for use in the embodiments of the present invention have the same number of TV white space channels.

Figure 2:
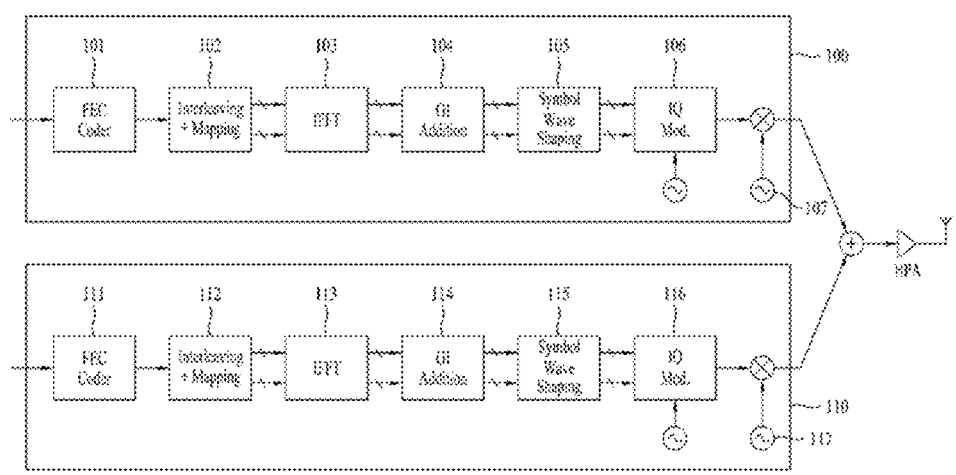
FIG. 2 is a block diagram illustrating a multi-block OFDM transmitter applicable to embodiments of the present invention.

FIG. 2 is a block diagram illustrating a multi-block OFDM transmitter applicable to embodiments of the present invention. As can be seen from FIG. 2, two OFDM blocks are used. Referring to FIG. 2, two OFDM transmitters prescribed in the IEEE 802.11 standard are connected in parallel to each other. A first part 100 of the multi-block transmitter may use a bandwidth corresponding to a channel of the first OFDM block, and a second part 110 thereof may use a bandwidth corresponding to a channel of the second OFDM block.

Functions of respective blocks contained in the OFDM transmitter will hereinafter be described in detail. The Forward Error Correction (FEC) coder block 101 or 111 may add redundant information (also called only "redundancy") to a scrambled bitstream using a convolutional code and the like. The "Interleaving+Mapping" block 102 or 112 may perform interleaving to scatter burst errors capable of being generated during transmission, may group the interleaved bitstreams into a predetermined number of parts, and may map the grouped result to frequency-domain symbols to be inserted into subcarriers using a modulation scheme such as QAM or the like. The Inverse Fast Fourier Transform (IFFT) block 103 or 113 may convert the mapped frequency-domain symbols into time-domain symbols (for example, sine waves, etc.) through IFFT processing. The guard interval (GI) addition block 104 or 114 may add a guard interval (GI) to the front end of the time-domain symbol so as to maintain orthogonality between subcarriers. The symbol wave shaping block 105 or 115 may adjust a waveform of a sample of the time domain including the GI so as to prevent the occurrence of inter-symbol interference (ISI). Thereafter, the "IQ Mod. Block" 106 or 116 performs up conversion to an intermediate frequency (IF) band. The oscillator 107 or 117 may perform up conversion to an actual transmission frequency band, and may amplify and transmit the up conversion result.

In this case, two OFDM blocks have a bandwidth corresponding to the set or aggregate of channels at different frequencies, such that it is necessary for the oscillator 107 or 117 to have different oscillation frequencies.

Figure 3:
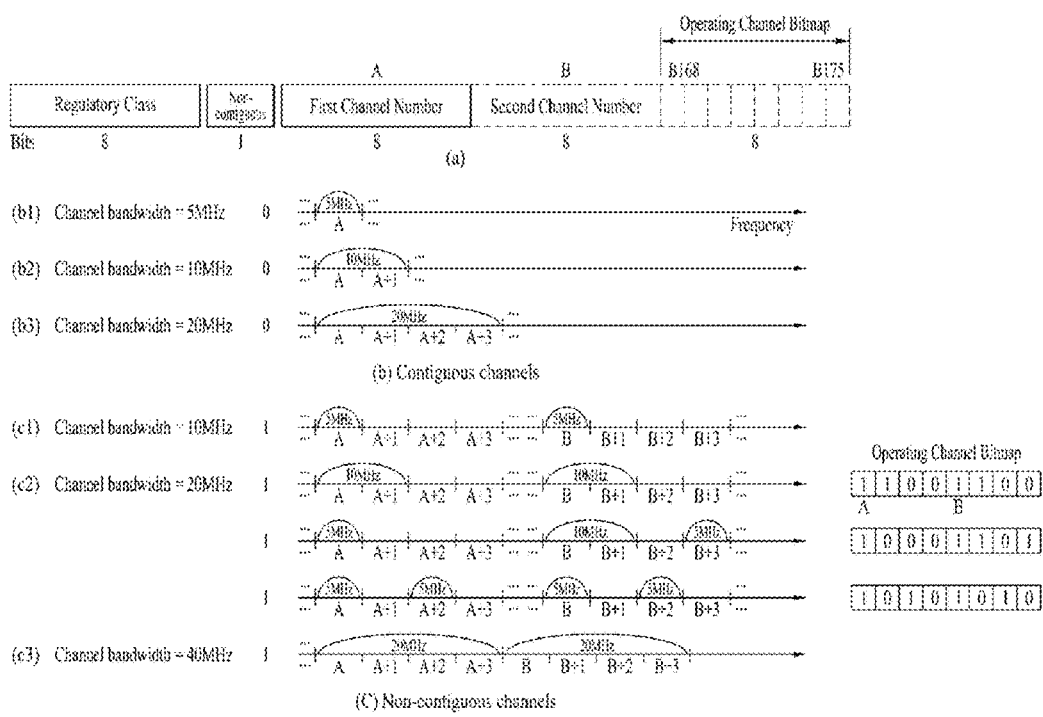
FIG. 3 is a conceptual diagram illustrating a physical layer transmission scheme.

FIG. 3 is a conceptual diagram illustrating a physical layer transmission scheme. FIG. 3(a) illustrates TV channel information that is now being used in the multi-block OFDM transmission scheme according to an embodiment of the present invention. FIG. 3(b) illustrates the use of contiguous TV channels, and FIG. 3(c) illustrates the use of non-contiguous TV channels.

Referring to FIG. 3(a), in order to indicate current TV channels, a regulatory class field, a non-contiguous field, a first channel number field (A), a second channel number field (B), and an operating channel bitmap field (B168~B175) may be used.

The regulatory class field is a field indicating bandwidth information used by the IEEE 802.11 TVWS network, and may be denoted by 8 bits. The regulatory class field may also be replaced with a predefined field (for example, a field predefined in IEEE 802.11y). The non-contiguous field may indicate continuity of TV channels used by the IEEE 802.11 TVWS network. The non-contiguous field may be denoted by 1 bit. For example, if the non-contiguous field is set to zero (0), this means the use of contiguous TV channels. If the non-contiguous field is set to 1, this means the use of non-contiguous TV channels. If two OFDM blocks are used, the first channel number field (A) may indicate the lowest channel number from among TV channels used by the first OFDM block. The second channel number field (B) may indicate the lowest channel number from among TV channels used by the second OFDM block. The operating channel bitmap field (B168~B175) may convert a TV channel used for actual transmission in the entire OFDM block into bitmap information. In this case, the used TV channel may be represented by '1' and the unused TV channel may be represented by '0', and the used and unused TV channels may be stored in the form of bitmap. Each of the first channel number field (A), the second channel number field (B), and the operating channel bitmap field (B168~B175) may be denoted by 8 bits.

The above-mentioned fields may form a single frame, such that they may be transmitted from an STA (especially, AP) through the single frame. In addition, the above-mentioned fields may be further included in a frame satisfying the legacy IEEE 802.11 standard specification, and a detailed example thereof will be explained later.

In FIGS. 3(b) and 3(c), one OFDM block may be comprised of four TV channels as an example. However, the scope or spirit of the present invention is not limited thereto and one or more TV channels may construct one OFDM block according to a bandwidth to be used. In addition, some or all TV channels from among one OFDM block may be used as a bandwidth of the IEEE 802.11 TVWS network. Examples of the present invention will hereinafter be described in detail.

FIG. 3(b) shows the use of contiguous TV channels. In this case, the non-contiguous field may be set to zero (0), and one OFDM block may be used for transmission. In more detail, FIG. 3(b1) shows the use of the 5 MHz bandwidth on the condition that one TV channel is used. FIG. 3(b2) shows the use of the 10 MHz bandwidth on the condition that two TV channels are used. FIG. 3(b3) shows the use of the 20 MHz bandwidth on the condition that four TV channels are used. The above-mentioned cases shown in FIGS. 3(b1) to 3(b3) may transmit data through one OFDM block.

Since contiguous TV channels are used in the example of FIG. 3(b), a currently-used TV channel may be denoted by a used bandwidth and a first TV channel. Therefore, from among the fields of FIG. 3(a), the currently-used TV channel may be correctly denoted by the regulatory class field, the non-contiguous field, and the first channel number field. The used channel can be represented by the above-mentioned three fields, such that the second channel number field and the operating channel bitmap field may be deactivated.

However, due to the presence of a TV channel used by a primary user (PU) in the IEEE 802.11 TVWS network, the case of using contiguous TV channels shown in FIG. 3(b) may be difficult to be used. Therefore, as shown in FIG. 3(c), two OFDM blocks may be used. For convenience of description and better understanding of the present invention, the exemplary case of FIG. 3 (c2) will first be explained, and the exemplary cases of FIGS. 3(c1) and 3(c3) will then be explained.

FIG. 3(c2) exemplarily shows that the IEEE 802.11 TVWS network has a bandwidth of 20 MHz. A first example of FIG. 3(c2) shows that each of two OFDM blocks uses two TV channels. The first OFDM block uses the 10 MHz bandwidth at two TV channels (A, A+1) from among four contiguous TV channels (A, A+1, A+3, A+4). The second OFDM block may use the 10 MHz bandwidth at two TV channels (B, B+1) from among four contiguous TV channels (B, B+1, B+2, B+3). Unused TV channels (A+3, A+4, B+3, B+4) not used in respective OFDM blocks may be nullified. In this case, the 'nullified' means that zero (0) is transmitted to a subcarrier corresponding to the unused TV channel.

If the IEEE 802.11 TVWS network uses the TV channel as described above, the STA may indicate current channel information using a variety of fields, i.e., the regulatory class field, the non-contiguous field, the first channel number field, the second channel number field, and the operating channel bitmap field. In more detail, the regulatory class field may indicate that the used bandwidth is set to 20 MHz. Since the used TV channels are non-contiguous to one another, the non-contiguous field may be set to '1'. The first channel number field may indicate the lowest channel number (A) from among the first OFDM block. The second channel number field may indicate the lowest channel number (B) from among the second OFDM block. The operating channel bitmap field may indicate a TV channel selectively used in the first or second OFDM block. That is, TV channels (A, A+1) are used in the first OFDM block, such that "1, 1, 0, 0" is denoted. TV channels (B, B+1) are used in the second OFDM block, such that "1, 1, 0, 0" is denoted. The operating channel bitmap field may be represented by "1, 1, 0, 0, 1, 1, 0, 0".

In the second example of FIG. 3(c2), one TV channel (A) is used in the first OFDM block, and the 20 MHz bandwidth is used in the second OFDM block using three TV channels (B, B+1, B+3). In this case, the regulatory class field may denote the 20 MHz bandwidth, and the non-contiguous field may be set to 1. The first channel number field may be denoted by A, the second channel number field may be denoted by B, and the operating channel bitmap field may be denoted by "1, 0, 0, 0, 1, 1, 0, 1".

In the third example of FIG. 3(c2), two TV channels (A, A+2) are used in the first OFDM block, and the 20 MHz bandwidth is used in the second OFDM block using two TV channels (B, B+2). In this case, the regulatory class field may denote the 20 MHz bandwidth, and the non-contiguous field may be set to 1. The first channel number field may be denoted by A, the second channel number field may be denoted by B, and the operating channel bitmap field may be denoted by "1, 0, 1, 0, 1, 0, 1, 0".

In this way, provided that the IEEE 802.11 TVWS network uses the 20 MHz bandwidth and two OFDM blocks, the TV channel may be selectively used. In this case, the used channel information can be correctly indicated using the regulatory class field, the non-contiguous field, the first channel number field, the second channel number field, and the operating channel bitmap field.

FIG. 3(c1) shows that the IEEE 802.11 TVWS network has the bandwidth of 10 MHz and two OFDM blocks are used. In this case, a necessary bandwidth may be guaranteed using one TV channel (for example, A or B) for each OFDM block. In addition, the channels A and B used in individual OFDM blocks may be correctly represented using the regulatory class field, the non-contiguous field, the first channel number field, and the second channel number field. It can be recognized that the entire bandwidth is 10 MHz on the basis of the regulatory class field. It can also be recognized that channels requisite for the 10 MHz bandwidth are set to A and B on the basis of the first channel number field and the second channel number field. As a result, the operating channel bitmap field need not be used. Therefore, the operating channel bitmap field may be deactivated to reduce control overhead.

FIG. 3(c3) shows that two OFDM blocks are used on the condition that the IEEE 802.11 TVWS network has the bandwidth of 40 MHz. In this case, contiguous TV channels must be divided into a predetermined number of 20 MHz units (for example, two OFDM blocks), the non-contiguous field may be set to '1' and may indicate a current channel using the first channel number field and the second channel number field. In the same manner as in FIG. 3(c1), the operating channel bitmap is used as the overlapping information, such that the operating channel bitmap may be deactivated to reduce control overhead.

Figure 4:
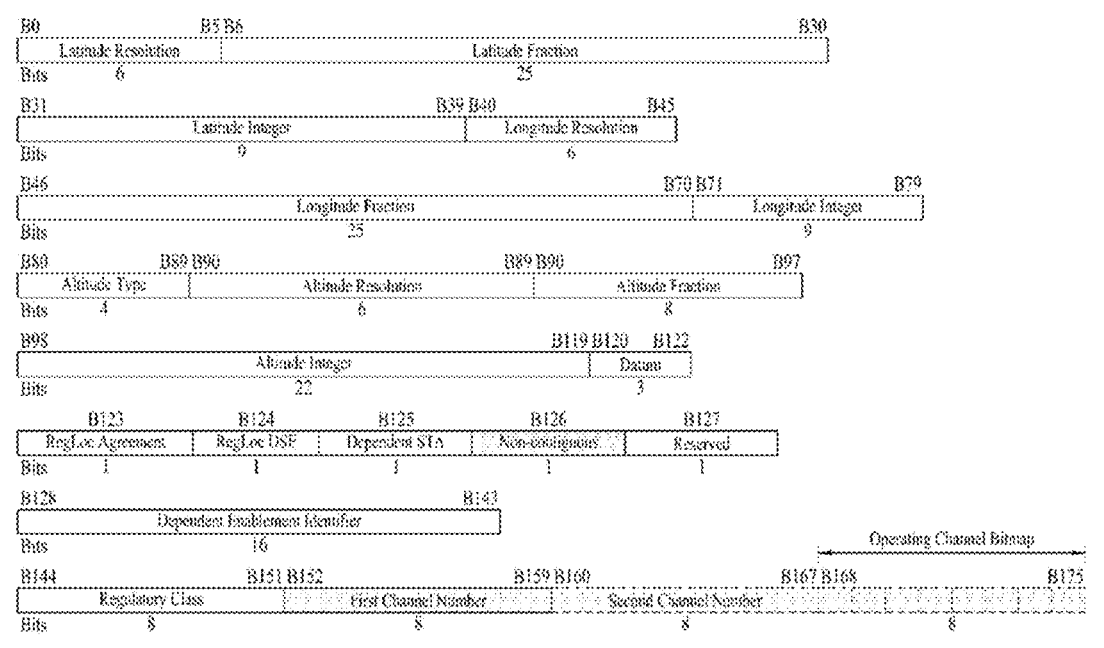

The above-mentioned message fields may be added to the IEEE 802.11af standard Dynamic STA Enablement (DSE) Registered Location element format, such that the added resultant fields may then be transmitted. FIG. 4 shows the modified DSE registered location element format.

In more detail, according to the IEEE 802.11af standard, the AP may broadcast a DSE registered location element through a beacon frame, and may inform a peripheral part of a channel to be used. The DSE Registered Location element may include latitude, longitude, and altitude.

As shown in FIG. 4, the non-contiguous field (B126), the first channel number field (B152~B159), the second channel number field (B160~B167), and the operating channel bitmap field (B168~B175) may be added to the DSE registered location element. Four fields added to the example of FIG. 4 may be denoted by shade parts. The regulatory class field (B144~B151) is defined in the legacy DSE registered location element format.

Figure 5:
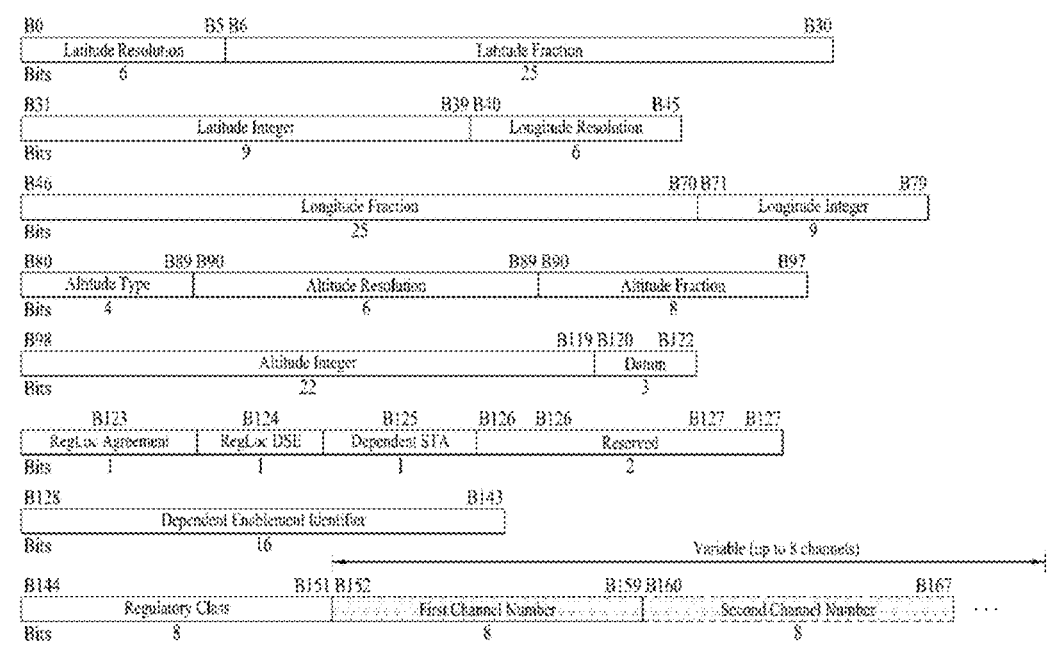

On the other hand, differently from the above-mentioned case in which the above-mentioned embodiment uses the 20 MHz OFDM block, the IEEE 802.11 TVWS network may also use the 5 MHz OFDM block. In this case, the number of OFDM blocks may be determined according to the used bandwidth. In the case of using a maximum of the 40 MHz bandwidth in the same manner as in the IEEE 802.11af network, a maximum of 8 OFDM blocks may be used. In this case, currently-used channel information may be transmitted using the DSE registered location element as shown in FIG. 5. In order to minimize control overhead, the modified DSE registered location element has as many channel number fields as the number of TV channels used by the IEEE 802.11 TVWS network. The N-th channel number field may indicate a TV channel number used by the N-th OFDM block. Since the 40 MHz bandwidth can be used at maximum as described above, the modified DSE registered location element may have a maximum of 8 channel number fields (B152~).

Figure 6:
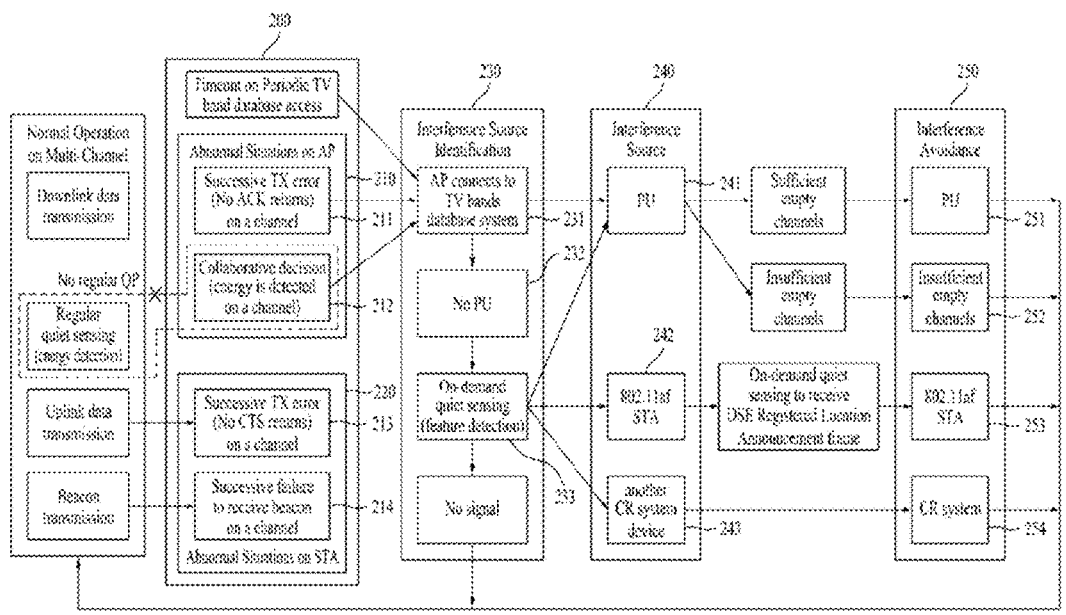
FIG. 6 is a conceptual diagram illustrating an interference avoidance procedure.

FIG. 6 is a conceptual diagram illustrating an interference avoidance procedure for use in the IEEE 802.11 TVWS network. A variety of signals may interfere data transmission over the IEEE 802.11 TVWS network, for example, a PU signal, a signal of the same CR network (i.e., IEEE 802.11 TVWS network), and a signal of a different CR network (for example, IEEE 802.22 network, ECMA-392 network, etc.) operating in a TV broadcast band. In order to smoothly operate the IEEE 802.11 TVWS network, an appropriate avoidance procedure for such interference is needed. The interference avoidance procedure of the IEEE 802.11 TVWS network is classified into an interference sensing step 200, an interference source identification step 230, and an interference avoidance step 250, and a detailed description thereof will hereinafter be described in detail.

Referring to FIG. 6, the interference sensing step 200 may be achieved by the AP and the non-AP STA. If a specific case, in which the AP (See 210) transmits a data frame to a certain STA and does not receive an acknowledgement (ACK) response, successively occurs (See 211), this means the presence of interference. Alternatively, a quite period (QP) for detecting a PU on a current channel may be periodically arranged in the IEEE 802.11 TVWS network. In more detail, during the quiet period (QP), transmission/reception (Tx/Rx) operations are interrupted and the sensing operation is performed only. Even in the case of receiving high energy during the QP (See 212), the presence of interference may be decided.

If successive TX errors occur in a normal operation for transmitting uplink data (See 213), the STA (See 220) may decide the presence of interference. In more detail, an exemplary case, in which the STA transmits a Ready To Send (RTS) frame and does not receive a Confirm To Send (CTS) frame, may successively occur. The exemplary case may be associated with the presence of interference.

In addition, the presence of interference may also be decided in the case in which the STA does not receive a beacon frame (See 214). If the STA detects such interference, it reports the detected interference to the AP and waits for a command of the AP.

In this way, if interference is detected by the AP and STA, the AP enters the interference source identification step (See 230). In more detail, the AP gains access to a PU database (PU DB), and determines whether an interference source is a PU that has been registered in the PU DB (See 231). If the interference source is determined to be the PU (See 241), the interference avoidance step 250 is performed. If it is impossible for the AP to determine whether the interference source is a PU through the PU DB (See 232), feature detection capable of identifying signal categories may be additionally performed (See 233). Through this feature detection, it is determined whether the interference source is a PU (See 241), it is determined whether the interference source is the same CR network device (See 242), or it is determined whether the interference source is a different CR network device operating in a TV broadcast band (See 243).

If the interference source is identified, the following interference avoidance operation 250 may be performed by the AP according to individual interference sources.

If the interference source is an STA of another IEEE 802.11 TVWS network (hereinafter referred to as an interference source STA), transmission power control (TPC) of the interference source STA is requested through exchange of control messages between networks as in the IEEE 802.11y network (See 253). That is, the STA (or AP) having detected such interference receives a DSE registered location announcement frame of the interference source STA through additional sensing, and transmits the received DSE registered location announcement frame of the interference source STA to the AP. The AP can recognize an ID of the interference source STA and an AP address associated with the interference source STA through the received DSE registered location announcement frame, such that it can transmit a TPC request message for the interference source STA to the corresponding AP.

The case in which the interference source is set to a node of another CR network (See 254) is not included in the embodiments of the present invention.

If the interference source is a PU, the channel switching procedures 251 and 252 may be performed to protect the PU. Assuming that interference occurs, the channel switching procedures may be classified into one case 251 in which a sufficient number of empty channels are present in a TV white space and the other case 252 in which the sufficient number of empty channels are not present in the TV white space. The channel switching procedures will hereinafter be described with reference to FIG. 7.

Figure 7:
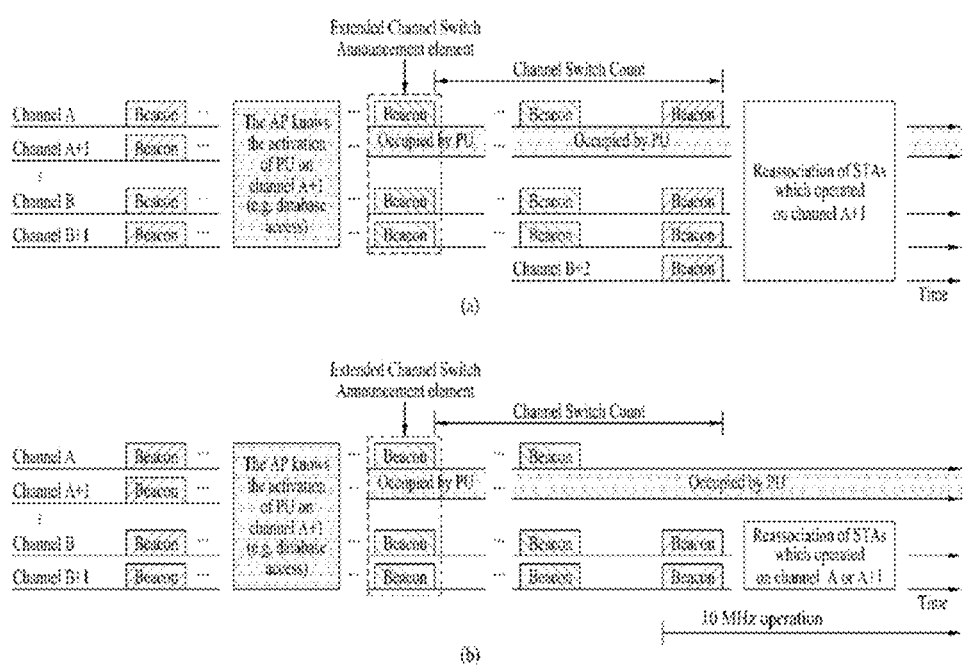
FIG. 7 is a conceptual diagram illustrating a channel switching procedure.

FIG. 7 is a conceptual diagram illustrating a channel switching procedure. FIG. 7(*a*) shows the channel switching procedure on the condition that a sufficient number of empty channels are present in a TV white space. FIG. 7(*b*) shows the other channel switching procedure on the condition that a sufficient number of empty channels are not present in the TV white space. In FIG. 7(*a*) or 7(*b*), a horizontal direction means a time axis, and a vertical direction means channels of a TV white space. In FIG. 7, two OFDM blocks may be exemplarily used, and the bandwidth may be exemplarily set to the 20 MHz bandwidth (See the first example of FIG. 3(*c*2)).

Referring to FIG. 7(*a*), the AP starting the channel switching procedure is designed to switch a channel in which the PU appears to an empty channel (i.e., a channel in which no PU appears), such that it can maintain the used bandwidth. In more detail, TV channels that are being used before interference occurrence may correspond to Channel A, Channel A+1, Channel B, and Channel B+1. As described above, the interference source is a PU, and the AP gains access to the PU DB such that it can recognize that a channel allowed for the PU (i.e., a channel to be used by the PU) is set to Channel A+1. In order to guarantee the use of Channel A+1 for the PU, the AP may switch a previous channel (Channel A+1) to an empty channel (Channel B+2). Channels to be used after channel switching may be set to Channel A at a first OFDM block, or may be set to Channel B, Channel B+1, and Channel B+2 at a second OFDM block. If Channel B+2 is not empty, Channel B+3 may be used differently from the above-mentioned description.

In addition, in the case of using two OFDM blocks, the TV channel in which no PU appears may also be switched to another channel. For example, if Channels B+2 and B+3 of the second OFDM block are not empty as shown in FIG. 7(*a*), it is necessary for not only Channel A+1 but also Channel A in which no PU appears to be switched to a different available TV channel, such that the bandwidth can be maintained.

FIG. 7(*b*) shows that the bandwidth is reduced on the condition that a sufficient number of empty channels are not present. That is, as can be seen from FIG. 7(*b*), provided that PU appears in Channel A+1 and another empty channel to be switched is not present in Channel A+1, the bandwidth is reduced to the 10 MHz bandwidth using Channel B and Channel B+1 of the second OFDM block.

Referring to FIGS. 7(*a*) and 7(*b*), the STA, that uses a channel in which the PU appears and performs channel switching, needs to receive a new channel through the re-association procedure related to the AP.

On the other hand, as can be seen from FIG. 7, it can be recognized that a beacon frame is transmitted over all channels that are being used. That is, the AP may command all STAs to perform channel switching through the beacon frame in the same manner as in the IEEE 802.11y network. In this case, it is assumed that the beacon frame is transmitted in only one channel from among a plurality of TV channels used in the IEEE 802.11 TVWS network in the same manner as in the IEEE 802.11n network. In this case, if the PU appears in a channel for transmitting the beacon frame, some or all STAs may not receive the beacon frame due to the presence of interference, such that it may be difficult for channel switching to be quickly and stably performed. In order to solve the aforementioned problems, the IEEE 802.11 TVWS network may transmit the beacon frame over all the TV channels that are now being used. If it is assumed that the beacon frame is transmitted as described above, although the STA does not receive the beacon frame in any one channel due to PU interference, it can receive the beacon frame in the remaining channels, such that it can quickly and stably perform channel switching.

The STA operating at 5 MHz can receive the beacon frame in only one TV channel, such that it is impossible for the STA to perform the above-mentioned operations. In order to solve the aforementioned problem, if the STA operating at 5 MHz does not receive the beacon frame for a predetermined time, it moves to another one channel from among a plurality of channels of a current BSS and may receive a new channel through the re-association procedure related to the AP.

As described above, if the PU is used as the interference source, the AP may command STAs to perform channel switching. In this case, a variety of messages to be used will hereinafter be described with reference to FIGS. 8 and 9.

FIG. 8 shows a message indicating channel switching according to one embodiment of the present invention.

Referring to FIG. 8, it can be recognized that the extended channel switch announcement element of the legacy IEEE 802.11y standard has been modified or changed. The extended channel switch announcement element is a message that is broadcast by the AP through the beacon frame and commands STAs to perform channel switching. Four fields (i.e., the non-contiguous field (B0), the new first channel number field (B1~B7), the new second channel number fields (B8~B15), and the new operating channel bitmap field (B24~B31)) may be added to the extended channel switch announcement element, such that a TV channel to be used after switching completion can be indicated. In this case, the four fields are designed to use the same expression scheme as in the non-contiguous field, the first channel number field, the second channel number field, and the operating channel bitmap field defined in FIG. 3, and as such a detailed description will herein be omitted for convenience of description.

In addition, the message indicating the channel switching may be achieved by modification of the extended channel switch announcement frame as shown in FIG. 9. In more detail, the AP transmits the extended channel switch announcement frame so as to command STAs to perform channel switching. In this case, four fields (i.e., the non-contiguous field (B0), the new first channel number field (B1~B7), the new second channel number field (B8~B15), and the new operating channel bitmap (B24~B31)) are added to the extended channel switch announcement frame of the IEEE 802.11y standard, such that they can be used for the above-mentioned channel switching.

Purposes of the conventional fields of the extended channel announcement frame are equal to those of the IEEE 802.11y standard. Newly added fields indicate new channels to be used after completion of the channel switching, and the scheme for expressing the newly added fields are equal to those of FIG. 3.

Figure 10:
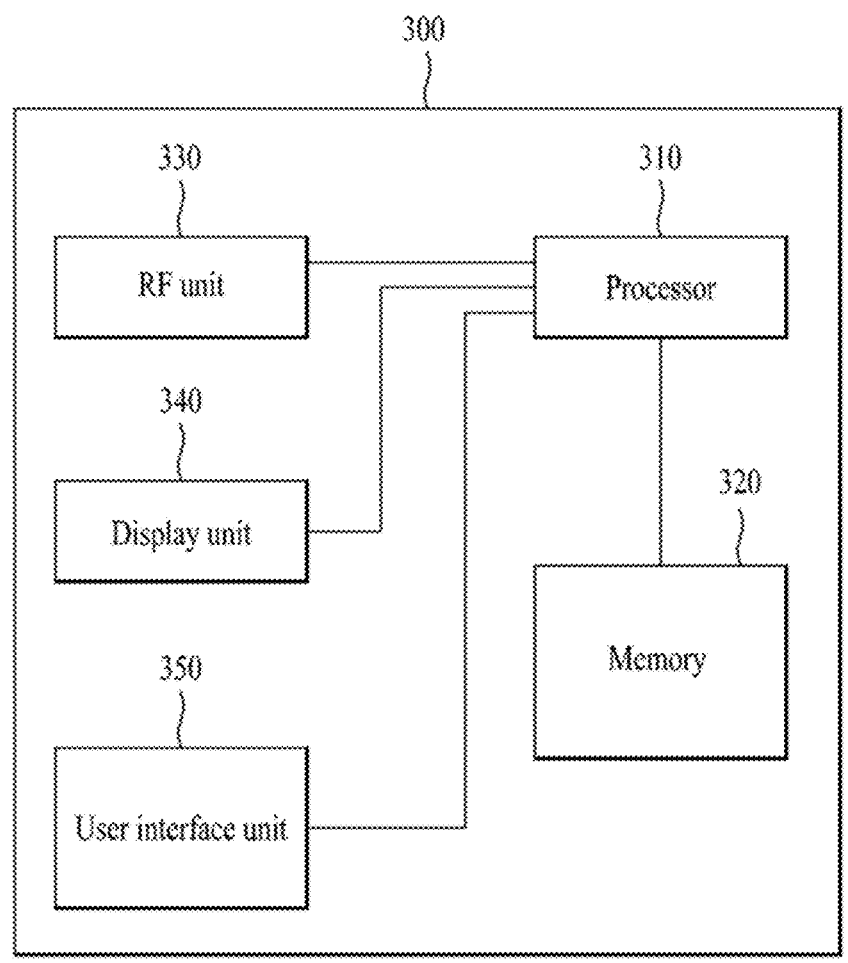
FIG. 10 is a block diagram illustrating a device applicable to a station or access point.

FIG. 10 is a block diagram illustrating a device applicable to either an STA or an AP according to embodiments of the present invention. Referring to FIG. 10, the device 300 includes a processor 310, a memory unit 320, a Radio Frequency (RF) unit 330, a display unit 340, and a user interface unit 350.

The layer of a physical interface protocol is performed in the processor 310. The processor 310 provides a control plane and a user plane. Functions of individual layers may be performed by the processor 310. In association with the embodiment in which the above-mentioned STA transmits channel information, the processor 310 may generate a message including first to fourth information. In addition, the processor 310 may generate messages indicating not only respective steps of the above-mentioned channel switching but also the channel switching. The above-mentioned messages and respective steps of the channel switching have already been disclosed, and as such a detailed description thereof will herein be omitted for convenience of description.

The memory unit 320 is electrically connected to the processor 310 and stores an operating system, applications, general files, etc.

If the device 300 is a user equipment (UE), the display unit 340 may display various types of information. The display unit 340 may be configured using, without being limited to, a Liquid Crystal Display (LCD), an Organic Light Emitting Diode (OLED), etc. The user interface unit 350 may be configured as a combination of known user interfaces such as a keypad, a touch screen, etc.

The RF unit 330 electrically connected to the processor 310 transmits and receives RF signals. The RF unit 330 may include a transmission (Tx) module and a reception (Rx) module.

The Tx module may encode and modulate transmission data scheduled by the processor 310 according to a predetermined coding and modulation scheme and provide the modulated data to the antennas.

The Rx module may recover original data by demodulating and decoding data received through the antennas and provide the recovered data to the processor 310.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

MODE FOR THE INVENTION

Various embodiments have been described in the best mode for carrying out the invention.

INDUSTRIAL APPLICABILITY

The embodiments of the present invention relate to a wireless communication system, and are applicable to a cognitive radio (CR) network. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting an operation channel information for a station (STA) in a TV white space by an access point (AP), the method comprising:
    transmitting, by the AP to the STA, an operating channel information, which is determined based on TV white space channels,
    wherein the operating channel information includes channel widths consisting of two non-contiguous frequency segments, each of the non-contiguous frequency segments including one or more W MHz channels,
    wherein W is a basic channel width for the operating channel information,
    wherein the operating channel information includes lowest channel numbers of the two non-contiguous frequency segments; and
    before the transmitting, determining whether or not the channel width is identical to a half of an amount of each frequency segment,
    wherein, if it is determined that the channel width is not identical to a half of an amount of each frequency segment, the operating channel information includes a bitmap indicating the one or more contiguous W MHz channels, and
    wherein, if it is determined that the channel width is identical to a half of an amount of each frequency segment, the operating channel information does not include the bitmap.

2. The method of claim 1, wherein a bandwidth of the basic channel corresponds to one of: 6 Mhz, 7 Mhz, and 8 Mhz.

3. An access point (AP) for transmitting an operation channel information for a station (STA) in a TV white space, the AP comprising:
    a radio frequency (RF) unit; and
    a processor operatively coupled to the RF unit and configured to:
        transmit an operating channel information, which is determined based on TV white space channels, via the RF unit,
        wherein the operating channel information includes channel widths consisting of two non-contiguous frequency segments, each of the non-contiguous frequency segments including one or more W MHz channels,
        wherein W is a basic channel width for the operating channel information,
        wherein the operating channel information includes lowest channel numbers of the two non-contiguous frequency segments; and
        before the transmitting, determine whether or not the channel width is identical to a half of an amount of each frequency segment,
        wherein, if it is determined that the channel width is not identical to a half of an amount of each frequency segment, the operating channel information includes a bitmap indicating the one or more contiguous W MHz channels, and
        wherein, if it is determined that the channel width is identical to a half of an amount of each frequency segment, the operating channel information does not include the bitmap.

4. The AP of claim 3, wherein a bandwidth of the basic channel corresponds to one of: 6 Mhz, 7 Mhz, and 8 Mhz.

* * * * *